United States Patent
Tian et al.

(10) Patent No.: US 11,781,049 B2
(45) Date of Patent: Oct. 10, 2023

(54) ADHESIVE GLUE, CURING METHOD THEREFOR, AND APPLICATION THEREOF

(71) Applicant: SAE MAGNETICS (H.K.) LTD., Hong Kong (CN)

(72) Inventors: Zhan Qiu Tian, Hong Kong (CN); Bing Hui Lee, Hong Kong (CN); Wan Li Leng, Hong Kong (CN); Jian Long Lee, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 17/563,462

(22) Filed: Dec. 28, 2021

(65) Prior Publication Data
US 2023/0151254 A1    May 18, 2023

(30) Foreign Application Priority Data
Nov. 18, 2021  (CN) .......................... 202111374499.9

(51) Int. Cl.
*C09J 175/14*    (2006.01)
*C09J 7/35*    (2018.01)
*G11B 5/48*    (2006.01)

(52) U.S. Cl.
CPC .............. *C09J 175/14* (2013.01); *C09J 7/35* (2018.01); *G11B 5/4826* (2013.01)

(58) Field of Classification Search
CPC .......... G11B 5/4826; C09J 7/35; C09J 175/14
See application file for complete search history.

(56) References Cited

PUBLICATIONS

Machine translation of CN111117533 A; Publicaiton date: May 8, 2020.*

* cited by examiner

*Primary Examiner* — Vishal I Patel
(74) *Attorney, Agent, or Firm* — NIXON & VANDERHY, P.C.

(57) ABSTRACT

The present disclosure discloses an adhesive glue, curing method therefor, and application thereof. The adhesive glue comprises the following components in percentage by weight: 50% to 80% of a polyurethane-modified acrylate, 0.1% to 10% of a thixotropic agent, 0.2% to 8% of a thermal initiator, and 2% to 30% of a diluent, wherein the thixotropic agent is a carbon nanotube. The adhesive glue is soft and resilient; it has a high viscosity, good thixotropy, low curing temperature, and high curing degree. Silicon precipitation can be prevented because silicon is not a component of the adhesive glue. The adhesive glue has strong adhesion and meets the production and performance requirements of the HDD binding process. In addition, the adhesive glue can effectively prevent hard disk damage and scratching.

9 Claims, No Drawings

ADHESIVE GLUE, CURING METHOD THEREFOR, AND APPLICATION THEREOF

This application claims priority to CN 202111374499.9 filed Nov. 18, 2021, the entire contents of each of which are hereby incorporated by reference.

TECHNICAL FIELD

This invention belongs to the field of adhesive glues and relates to an adhesive glue, curing method therefor, and application thereof.

BACKGROUND

The hard disk drive (HDD) is mainly composed of magnetic disk, head stack assembly (HSA), dual-stage assembly (DSA), head gimbals assembly (HGA), slider head assembly, pre-amp on flex assembly, VCM assembly, among others. These components need to be bound with adhesive glue. At present, HDD heads are mostly bound with fumed silica thickened acrylic glue. This glue has a high viscosity and good thixotropy, but it suffers from oxygen inhibition, causing the fumed silica to precipitate quickly. As a result, scratches and damage to the hard disk are common.

Therefore, it is necessary to develop an adhesive glue that has not only good viscosity and thixotropy but also reduced component precipitation, which in turn reduces scratches and damage to the hard disk.

SUMMARY OF THE DISCLOSURE

An objective of the present disclosure is to address the drawbacks of the prior art by providing an adhesive glue, a method for curing the adhesive glue, and an application of the adhesive glue. The adhesive glue does not contain silica; it has a high viscosity, good thixotropy, and high curing degree. When employing the sticky glue to bind HDD heads, no silica precipitation occurs, preventing scratching and damage to the hard disk.

To achieve the objective, in the first aspect, the present application provides an adhesive glue comprising the following components in percentage by weight: 50% to 80% of a polyurethane-modified acrylate, 0.1% to 10% of a thixotropic agent, 0.2% to 8% of a thermal initiator, and 2% to 30% of a diluent, wherein the thixotropic agent is a carbon nanotube.

Preferably, the thixotropic agent has a weight that is 0.5%-5% of that of the adhesive glue.

Preferably, the polyurethane-modified acrylate has a functionality of 2, a number average molecular weight of 5,000 to 100,000, and is a non-aqueous polyurethane-modified acrylate.

Preferably, the thermal initiator is at least one selected from the group consisting of benzoyl peroxide, lauroyl peroxide, tert-butyl benzoyl peroxide, methyl ethyl ketone peroxide, cumene peroxide, diisopropyl peroxide dicarbonate, dicyclohexyl peroxydicarbonate, tert-butylperoxy-2-ethylhexanoate, and tert-butyl peroxy isooctanoate.

Preferably, the diluent is an acrylate structural diluent.

Preferably, the diluent is at least one selected from the group consisting of IBOA, HEMA, PGEA, CTFA, THFA, TEGDMA, TMPTMA, EGDMA, β-CEA, and HDDA.

In the second aspect, the present disclosure provides a curing method for the adhesive glue, comprising heating to cure the adhesive glue after coating the adhesive glue on a surface of an object to be bound.

Preferably, the heating is performed at 80° C. to 160° C. for 1 min to 180 min.

In the third aspect, the present disclosure provides an application of the adhesive in binding a hard disk drive component.

Compared with the prior art, the beneficial effects of the present disclosure include the following: the adhesive glue is soft and resilient; it has a high viscosity, good thixotropy, low curing temperature, and high curing degree. Silicon precipitation can be prevented because silicon is not a component of the adhesive glue. The adhesive glue has strong adhesion and meets the production and performance requirements of the HDD binding process. In addition, the adhesive glue can effectively prevent hard disk damage and scratching.

DETAILED DESCRIPTION OF THE ILLUSTRATED EMBODIMENTS

To better illustrate the objective, technical solutions, and beneficial effects, the present disclosure will be further described below with reference to specific embodiments. Those skilled in the art should understand that these embodiments are only used to explain the present disclosure and are not intended to limit the scope of the present disclosure in any way.

Unless otherwise specified, the experimental methods used in the embodiments are conventional, and the materials and reagents are commercially available.

In the present disclosure, carbon nanotubes are employed instead of fumed silica to address the problem of easy precipitation of the fumed silica thixotropic agent in a traditional acrylic glue; fumed silica precipitation leads to scratches and damage to the hard disk when employing acrylic glue to bind HDD heads. On the other hand, carbon nanotubes are difficult to precipitate; furthermore, they are able to change the glue's viscosity and thixotropic index. When used for binding HDD parts, the adhesive glue of the present disclosure can meet the HDD binding process's production and performance requirements, as well as efficiently prevent hard disk scratches and damage. Specifically, the adhesive glue of the present disclosure comprises the following components in percentage by weight: 50% to 80% of a polyurethane-modified acrylate, 0.1% to 10% of a thixotropic agent, 0.2% to 8% of a thermal initiator, and 2% to 30% of a diluent, wherein the thixotropic agent is a carbon nanotube.

Carbon nanotubes having a large aspect ratio and a large specific surface area are used as the thixotropic agent in the adhesive glue of the present disclosure. Carbon nanotubes of this type are difficult to precipitate, can effectively change the viscosity and thixotropy index of the glue, and allow the glue to be both soft and resilient, with an elongation at break of over 200%, all of which match product requirements. The glue can be cured completely at a low temperature. For example, the curing degree of the glue can reach over 95% at 80-120° C. (measured by Fourier transform infrared spectroscopy (FITR)). The glue also has strong adhesion; for example, adhesion on HGA can be 300 gf or more.

The weight of the carbon nanotube is 0.1%-10% of the weight of the adhesive glue, such as 0.1%, 0.5%, 1%, 2%, 3%, 4%, 5%, 6%, 7%, 8%, 9%, 10% of the weight of the adhesive glue. In some preferred embodiments, the weight of the carbon nanotube is 0.5% to 5% of the weight of the adhesive glue. There are no restrictions on the type of carbon nanotubes that can be employed.

The weight of polyurethane-modified acrylate is 50%-80% of the weight of the adhesive glue, such as 50%, 55%, 60%, 70%, 75%, 80%, etc. of the weight of the adhesive glue.

In some preferred embodiments, the polyurethane-modified acrylate has a functionality of 2, a number average molecular weight of 5,000 to 100,000, and is a non-aqueous polyurethane-modified acrylate. The polyurethane-modified acrylate should be non-aqueous so that the adhesive glue is water-resistant. To achieve a quick molecular reaction, the polyurethane-modified acrylate should have a functionality of 2 and a number average molecular weight of 5,000 to 100,000. Any method of modifying acrylate with polyurethane can be used to synthesis polyurethane-modified acrylate.

The weight of the thermal initiator is 0.2%-8% of the weight of the adhesive glue, such as 0.2%, 0.5%, 1%, 1.5%, 2%, 2.5%, 3%, 3.5%, 4%, 4.5%, 5%, 5.5%, 6%, 6.5%, 7%, 7.5%, 8%, etc. of the weight of the adhesive glue. The type of thermal initiator is not limited, examples include at least one selected from the group consisting of benzoyl peroxide, lauroyl peroxide, tert-butyl benzoyl peroxide, methyl ethyl ketone peroxide, cumene peroxide, diisopropyl peroxide dicarbonate, dicyclohexyl peroxydicarbonate, tert-butylperoxy-2-ethylhexanoate, and tert-butyl peroxy isooctanoate.

The weight of the diluent is 2%-30% of the weight of the adhesive glue, such as 2%, 3%, 4%, 5%, 6%, 7%, 8%, 9%, 10%, 12%, 15%, 18%, 20%, 22%, 25%, 28%, 30%, etc. of the weight of the adhesive glue. In some embodiments, the diluent is an acrylate structural diluent to facilitate the rapid cross-linking reaction with the main resin. The diluent could be an acrylate structural compound or a mixture of acrylate structural compounds, such as at least one selected from the group consisting of IBOA (isobornyl acrylate), HEMA (hydroxyethyl methacrylate), PGEA (phenyl glycidyl ether acrylate), CTFA (cyclic trimethylolpropane formal acrylate), THFA (tetrahydrofuran acrylate), TEGDMA (triethylene glycol dimethacrylate), TMPTMA (trimethylolpropane trimethacrylate), EGDMA (ethylene glycol dimethacrylate), β-CEA (β-carboxyethyl acrylate), HDDA (1,6-hexanediol diacrylate), among others.

The preparation method of the adhesive glue of the present disclosure is not limited as long as the raw materials are mixed thoroughly. For example, the raw materials can be mixed and then thoroughly stirred.

After the adhesive glue of the present disclosure is coated on the surface of the object to be bound, it can be well cured after heating at 110° C. –160° C. for 1 min-180 min.

The adhesive glue of the present disclosure can be used to bind electronic products and the like. For example, it can be used to bind HDD components.

EMBODIMENTS 1-8

Embodiments 1 to 8 each provide an adhesive glue, the compositions of these adhesive glues are shown in Table 1. In embodiments 1-8, the thixotropic agent is a carbon nanotube (product ID: XFM15, manufactured by Nanjing XFNANO Materials Tech Co., Ltd); the thermal initiator is BPO (benzoyl peroxide) produced by Jinan Hengda Chemical Additives Co., Ltd.; the diluent is IBOA (isobornyl acrylate) manufactured by Sartomer Guangzhou Chemical Co. Ltd. In embodiments 1 to 5 and 8, the polyurethane-modified acrylate has a functionality of 2 and a number average molecular weight (Mn) of 50,000, and it is a non-aqueous polyurethane-modified acrylate (product ID: EB8413, manufactured by Eternal Materials Co., Ltd). In embodiment 6, the polyurethane-modified acrylate has a functionality of 2 and Mn of 5,000, and it is a non-aqueous polyurethane-modified acrylate (product ID: CN9782, manufactured by Sartomer Guangzhou Chemical Co. Ltd). In embodiment 7, the polyurethane-modified acrylate has a functionality of 2 and Mn of 100,000, and it is a non-aqueous polyurethane-modified acrylate (product ID: CN8003, manufactured by Sartomer Guangzhou Chemical Co. Ltd). The preparation methods of these adhesive glues all include the following steps: mixing the polyurethane-modified acrylate, the thixotropic agent, the thermal initiator, and the diluent; then stirring thoroughly to obtain the adhesive glue.

TABLE 1

| | | | | |
|---|---|---|---|---|
| Composition of the Adhesive Glue/wt % | | | | |
| Components | Embodiment 1 | Embodiment 2 | Embodiment 3 | Embodiment 4 |
| Polyurethane-modified acrylate (Mn = 5,000) | 0 | 0 | 0 | 0 |
| Polyurethane-modified acrylate (Mn = 50,000) | 70 | 70 | 70 | 70 |
| Polyurethane-modified acrylate (Mn = 100,000) | 0 | 0 | 0 | 0 |
| Thixotropic agent | 0.1 | 0.5 | 3 | 5 |
| Thermal initiator | 2 | 2 | 2 | 2 |
| Diluent | 25.9 | 25.5 | 23 | 21 |

| Components | Embodiment 5 | Embodiment 6 | Embodiment 7 | Embodiment 8 | Comparative example 1 |
|---|---|---|---|---|---|
| Polyurethane-modified acrylate (Mn = 5,000) | 0 | 50 | 0 | 0 | 0 |
| Polyurethane-modified acrylate (Mn = 50,000) | 70 | 0 | 0 | 80 | 70 |

TABLE 1-continued

| Composition of the Adhesive Glue/wt % | | | | | |
|---|---|---|---|---|---|
| Polyurethane-modified acrylate (Mn = 100,000) | 0 | 0 | 80 | 0 | 0 |
| Thixotropic agent | 10 | 10 | 9.8 | 9.8 | 3 |
| Thermal initiator | 2 | 5 | 8 | 0.2 | 2 |
| Diluent | 16 | 30 | 2 | 2 | 23 |

Comparative Example 1

Comparative Example 1 provides an adhesive glue. Apart from replacing the carbon nanotube with the same mass of fumed silica (product ID: M-5, manufactured by Cabot Corporation), the adhesive glue's components are identical to those of embodiment 3. The adhesive glue was made in the same manner as the adhesive glue of embodiment 3.

Effect Example 1

An adhesive glue sample was coated on the surface of a magnetic head and was heated at 120° C. for 60 minutes before cooling to room temperature to measure curing degree, adhesion, and elongation at break of the adhesive glue. The percentage of scratching and damaging of the HDD obtained was also measured.

Curing degree was measured as follows: infrared spectroscopy was used to measure the residual value of the absorption peak of the reacted resin to calculate the percentage of unreacted resin, thereby calculating the curing degree of the adhesive glue.

Adhesion was measured by measuring the shear force of stainless steel to stainless steel; please refer to GB/T 7124-2008.

Elongation at break was measured by curing the adhesive glue into a strip (length×width×height=150 mm×10 mm×1 mm), and then using a universal tensile machine to measure the elongation at break of the strip; please refer to GB/T 1040.1-2018.

The percentage of scratching and damaging of the HDD was measured as follows: a product made from an adhesive glue sample was assembled to the HDD. After 240 hours of operation, measure the scratched area per unit area of the disk to calculate the percentage of scratching and damaging of the HDD. 3 parallel samples were used in each group.

The test results are shown in Table 2.

TABLE 2

| Sample | Curing degree/% | Adhesion/gf | Elongation at break/% | Percentage of scratching and damaging/% |
|---|---|---|---|---|
| Embodiment 1 | 96.5 | 341 | 261 | 0 |
| Embodiment 2 | 95.9 | 350 | 256 | 0 |
| Embodiment 3 | 96.8 | 351 | 291 | 0 |
| Embodiment 4 | 97.3 | 378 | 288 | 0 |
| Embodiment 5 | 97.5 | 377 | 308 | 0.001 |
| Embodiment 6 | 98.6 | 394 | 322 | 0 |
| Embodiment 7 | 95.3 | 326 | 298 | 0 |
| Comparative example 1 | 96.1 | 334 | 288 | 0.18 |

Finally, it should be noted that the above embodiments are only used to illustrate the technical solutions of the present disclosure and are not intended to limit the protection scope. Although the present disclosure has been described in detail with reference to the preferred embodiments, those of ordinary skill in the art should understand that the technical solution of the present disclosure can be modified without departing from the spirit and scope of the technical solution of the present disclosure.

What is claimed is:

1. An adhesive glue comprising the following components in percentage by weight: 50% to 80% of a polyurethane-modified acrylate, 0.1% to 10% of a thixotropic agent, 0.2% to 8% of a thermal initiator, and 2% to 30% of a diluent, wherein the thixotropic agent is a carbon nanotube.

2. The adhesive glue according to claim 1, wherein the thixotropic agent has a weight that is 0.5%-5% of that of the adhesive glue.

3. The adhesive glue according to claim 1, wherein the polyurethane-modified acrylate has a functionality of 2, a number average molecular weight of 5,000 to 100,000, and is a non-aqueous polyurethane-modified acrylate.

4. The adhesive glue according to claim 1, wherein the thermal initiator is at least one selected from the group consisting of benzoyl peroxide, lauroyl peroxide, tert-butyl benzoyl peroxide, methyl ethyl ketone peroxide, cumene peroxide, diisopropyl peroxide dicarbonate, dicyclohexyl peroxydicarbonate, tert-butylperoxy-2-ethylhexanoate, and tert-butyl peroxy isooctanoate.

5. The adhesive glue according to claim 1, wherein the diluent is an acrylate structural diluent.

6. The adhesive glue according to claim 5, wherein the diluent is at least one selected from the group consisting of IBOA, HEMA, PGEA, CTFA, THFA, TEGDMA, TMPTMA, EGDMA, β-CEA, and HDDA.

7. A curing method for the adhesive glue according to claim 1, comprising heating to cure the adhesive glue after coating the adhesive glue on a surface of an object to be bound.

8. The curing method according to claim 7, wherein the heating is performed at 80° C. to 160° C. for 1 min to 180 min.

9. An application of an adhesive glue in binding a hard disk drive component, wherein the adhesive glue comprises the following components in percentage by weight:
50% to 80% of a polyurethane-modified acrylate, 0.1% to 10% of a thixotropic agent, 0.2% to 8% of a thermal initiator, and 2% to 30% of a diluent, wherein the thixotropic agent is a carbon nanotube.

* * * * *